US007343345B1

United States Patent
Yeh et al.

(10) Patent No.: US 7,343,345 B1
(45) Date of Patent: Mar. 11, 2008

(54) PAYMENT MODEL FOR AN ENTERPRISE RESOURCE PLANNING SYSTEM

(75) Inventors: Jia-Shun Yeh, Taichung (TW); Ren-Hau Tu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1423 days.

(21) Appl. No.: 09/765,043

(22) Filed: Jan. 19, 2001

(51) Int. Cl.
*G06Q 17/60* (2006.01)
(52) U.S. Cl. .............................. 705/40; 705/1; 705/10
(58) Field of Classification Search .................... 25/22, 25/10, 21, 7; 705/10, 35–45
See application file for complete search history.

(56) References Cited

U.S. PATENT DOCUMENTS

| | | | |
|---|---|---|---|
| 5,089,970 A | 2/1992 | Lee et al. | 364/468 |
| 5,369,570 A | 11/1994 | Parad | 705/80 |
| 5,787,283 A | 7/1998 | Chin et al. | 395/701 |
| 5,953,707 A | 9/1999 | Huang et al. | 705/10 |
| 6,005,571 A | 12/1999 | Pachauri | 715/764 |
| 6,088,626 A | 7/2000 | Lilly et al. | 700/100 |

OTHER PUBLICATIONS

Lester Manuel, et al., "Enterprise Resource Planning (ERP) Systems, Applications and Products in Data Processing (SAP)," Enterprise Resource Planning/SAP, Fall 1997, pp. 1-20, http://disc.cba.uh.edu/~rhirsch/fall97/hampton/hsmitasa.htm., printed on Oct. 5, 2006.

Michelle Williams, et al., "Chargebacks/Web-based Procurement Inquiry," SAP E-Business Solutions [MySaP.com Business Scenarions], printed on Oct. 5, 2006.

*Primary Examiner*—Rich Weisberger
(74) *Attorney, Agent, or Firm*—Haynes and Boone, LLP

(57) ABSTRACT

A system and a computer software implemented method of processing payments comprising the following steps. A person enters a PO number, an invoice number and invoice amount from an invoice entry point into an invoice tracking module. The invoice tracking module transfers a PO number to a purchasing module. The purchasing module transfers a PO attribute to a payment configuration module. The payment configuration module transfers a payment control key to a goods receiving (GR) module. The goods receiving module transfers a GR list of the PO number to a GR-IR matching configure module. The GR-IR matching configure module transfers a GR number to a quality management module. The quality management module transfers a QI number to a document posting checking configure module. The document posting checking configure module checks the QI number. The document posting checking configure module transfers payment information to a vendor management module. The vendor management module initiates a payment to a vendor. The vendor management module sends payment information to a vendor.

17 Claims, 6 Drawing Sheets

FIG. 1 - Prior Art

| System Help | | |
|---|---|---|
| Company code | 1A01 | Document date | 11/16/1999 |
| Invoice number | X0221390458 | Amount | ? |
| Purchase order | 450003473658 | Tax amount | |
| Vendor code | 100373 | Exchange rate | |
| Vendor name | MAROMETRICS INCORPORATED | Tax Code | ? |
| Payment term | PUOS | Tax type | 22 |
| Text | 90% 1 mth aft delivery 10% 1 mth | Offset code | 2 |
| Currency | USA | Tax Number | 00100379 |

GR items

| GR number | Item | Short text | Open Qty | Unit |
|---|---|---|---|---|
| 50011358 | 1 | Nano AFX 800XSE Measurement System | 1 | ST |

Auto-classify invocies

FIG. 4B

| GUI Inv number | PO number | Vendor | GR number | Curr. | IR amount | Tax amount | Pyterm |
|---|---|---|---|---|---|---|---|
| 66YN003982 | 4500031624 | 100140 | 50075263 | JPY | 3,200.000 | 0 | AP01 |
| 9-2312 | 4500037394 | 100178 | 50076134 | JPY | 764,400 | 0 | AP01 |

Post all    SORT    Block/UnBlock

[ Auto-search GR number ]   [ Auto-check quality control ]   [ Auto-post voucher ]

PAYMENT MODEL FOR AN ENTERPRISE RESOURCE PLANNING SYSTEM

BACKGROUND OF INVENTION

1) Field of the Invention

This invention relates generally to a system and a method of paying vendors and more particularly to a system and a method for processing payments that is integrated with an enterprise resource planning (ERP) system and more particularly to a software program that processes payments and is integrated with an ERP system.

2) Description of the Prior Art

Enterprise Resource Planning (ERP) systems are used to run many of the large companies in the work. However, many ERP systems do not have adequate integration between the modules. For example, the inventors have found that the integration and data entry and data transfer between the modules involved in Purchase orders, Receiving, Quality, and Account payable is less than optimal.

U.S. Pat. No. 5,369,570(Parad) shows a resource management system.

U.S. Pat. No. 5,953,707(Huang et al.) shows a decision support system that works with the resource planning system and vender management.

U.S. Pat. No. 6,088,626(Lilly et al.) shows a method for scheduling orders.

U.S. Pat. No. 5,089,970(Lee et al.) shows an integrated manufacturing system

U.S. Pat. No. 5,787,283(Chin et al.) shows a manufacturing logistics decision support system.

U.S. Pat. No. 6,005,571(Pachauri) teaches a graphical interface to a database.

This invention provides an integrated solution to payment processing.

SUMMARY OF THE INVENTION

It is an object of the present invention to provide a system and a method for paying vendors. It is an object of the present invention to provide a software program for paying vendors using a system that is integrated with an Enterprise Resource Planning (ERP)system.

It is an object of the present invention to provide a system and a method with a portion implemented using computer software running on a computer for paying vendors using a system that is integrated with an Enterprise Resource Planning (ERP) system.

To accomplish the above objectives, the present invention provides a method implemented mainly by computer software. The invention is a computer software implemented method of processing payments, comprising the following steps.

A person enters an invoice number and invoice amount from an invoice entry point into a invoice tracking module.

The invoice tracking module transfers a PO number to a purchasing module. The purchasing module transfers a PO attribute to a payment configuration module.

A person enters payment terms and the payment terms are transferred into the payment configuration module prior to the PO is released and the invoice is received.

The payment configuration module transfers a payment control key to a goods receiving (GR) module.

The goods receiving module transfers a GR list of the PO number to a GR-IR matching configure module.

The GR-IR matching configure module transfers a GR number to a quality management module.

The quality management module transfers a QI number to a document posting checking configure module.

The document posting checking configure module checks the QI number.

The document posting checking configure module automatically posts an accounts payable document and then transfers payment information to a vendor management module.

The vendor management module sends payment information to a vendor.

Additional objects and advantages of the invention will be set forth in the description that follows, and in part will be obvious from the description, or may be learned by practice of the invention. The objects and advantages of the invention may be realized and obtained by means of instrumentalities and combinations particularly pointed out in the append claims.

BRIEF DESCRIPTION OF THE DRAWINGS

The features and advantages of a semiconductor device according to the present invention and further details of a process of fabricating such a semiconductor device in accordance with the present invention will be more clearly understood from the following description taken in conjunction with the accompanying drawings in which like reference numerals designate similar or corresponding elements, regions and portions and in which:

FIGS. 4A, 4B and 4C show views of computer screens (front end graphical user interface) according to a preferred embodiment of the present invention.

DETAILED DESCRIPTION OF THE PREFERRED EMBODIMENTS

A. Problem Invention Solves

Figure 1:
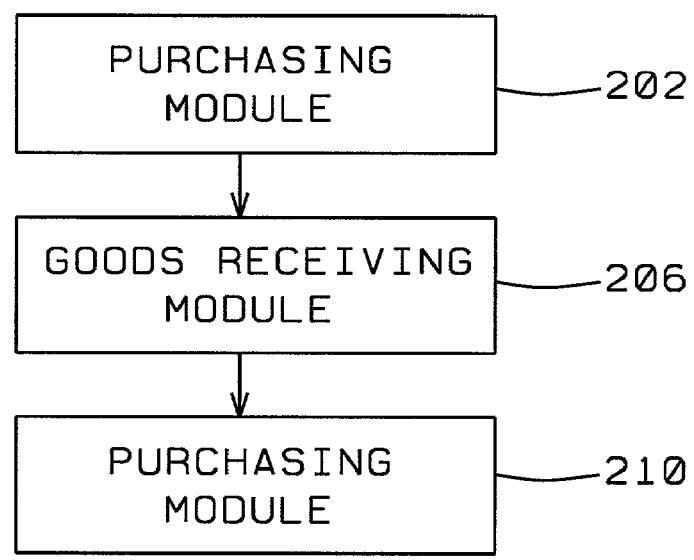
FIG. 1 is a flow chart of the payment processing system of the prior art.

Referring now to the drawings and more particularly to FIG. 1, there is shown an ERP system over which the present invention is an improvement. It is to be understood in this regard that no portion of FIG. 1 is admitted to be prior art as the present invention. Rather, this highly simplified diagram is an effort to provide an improved understanding of the problems that are overcome by the invention.

FIG. 1 shows three modules of an ERP system. The three module are: purchasing module 202, the goods receiving module 206 and the quality management module 210. However, the set-up has problems associated with processing payments.

For outgoing payment processing, vendors may send invoices to the company's several different departments (Accounting, Warehouse), various sites (HSIP, TSIP), or directly to users. The company accountants must collect and classify the different types of invoices manually for process. It takes a long, time to find out which PO (purchase order number) or GR (goods received number) items have not yet been cleared. Consequently, it also requires much time to ensure that the target GR (Goods receipt) has been quality inspected. Finally, accountants need to clear open GRs manually. In addition, vendors always call accounts or buyers for payment status queries. Much paperwork and manpower are required.

Disadvantages are as follows: 1) Huge manpower required, 2) Long processing time for Accounts Payable (A/P), 3) Much paperwork, and 4) Poor relationship with vendors.

B. Present Invention

The present invention will be described in detail with reference to the accompanying drawings. The present invention provides a system and a method of processing outgoing payments and integrating the payment system with 3 modules of an ERP system. See FIGS. 2 and 3.

C. Overview of the Invention

The invention comprises the following.

A person enters an invoice number 301 and invoice amount from an invoice entry point 104 into a invoice tracking module 108.

The invoice tracking module 108 transfers a PO number 302 to a purchasing module 202.

The purchasing module 202 transfers a PO attribute 306 to a payment configuration module 112.

A person enters payment terms 114 and the payment terms are transferred into the payment configuration module 112 prior to the PO is released and the invoice is received.

The payment configuration module 112 transfers a payment control key 310 to a goods receiving (GR) module 206.

The goods receiving module 206 transfers a GR list of the PO number 314 to a GR-IR matching configure module 116.

The GR-IR matching configure module 116 transfers a GR number 320 to a quality management module 210.

The quality management module 210 transfers a QI number 324 to a document posting checking configure module 120.

The document posting checking configure module 120 checks the QI 20 number.

The document posting checking configure module 120 automatically posts an accounts payable document and then transfers payment information 328 to a vendor management module 124.

The vendor management module 124 sends payment information 332 to a vendor 130.

D. Preferred Embodiment

In a preferred embodiment, the ERP system is a SAP ERP system. SAP is a ERP system made by SAP AG-Walldorf, 10 Neurottstrasse 16 69190 Waldorf Germany. The particular modules are: purchasing module (PO) 202, the goods receiving module (GR) 206 and the quality management module (QM) 210.

By using several key indexes to fully integrate 15 business process flow chains, the system, after quick processing, can automatically publish payment-status to many vendors. Of course, each vendor can only receive their own information. These key indexes are: PO number, PO Attribute, payment control key, GR number, QI number.

Main points of the invention are as follows:

1. Provide a screen to allow front-end accountants to key in certain parameters, e.g., PO number, invoice number and amount.

2. Auto-Classify invoice types based on PO attributes and payment term.

3. Dynamically search open GR numbers based on the entered PO number and amount

4. Link to the Quality Management System to check quality inspection status of the GR number.

5. If the target GR number has been quality inspected, then auto post A/P vouchers.

6. Automatically email payment status to vendors and enable vendors to on-line query payment status through a company website.

A preferred embodiment of the invention's method of processing payments is described below.

Figure 2:
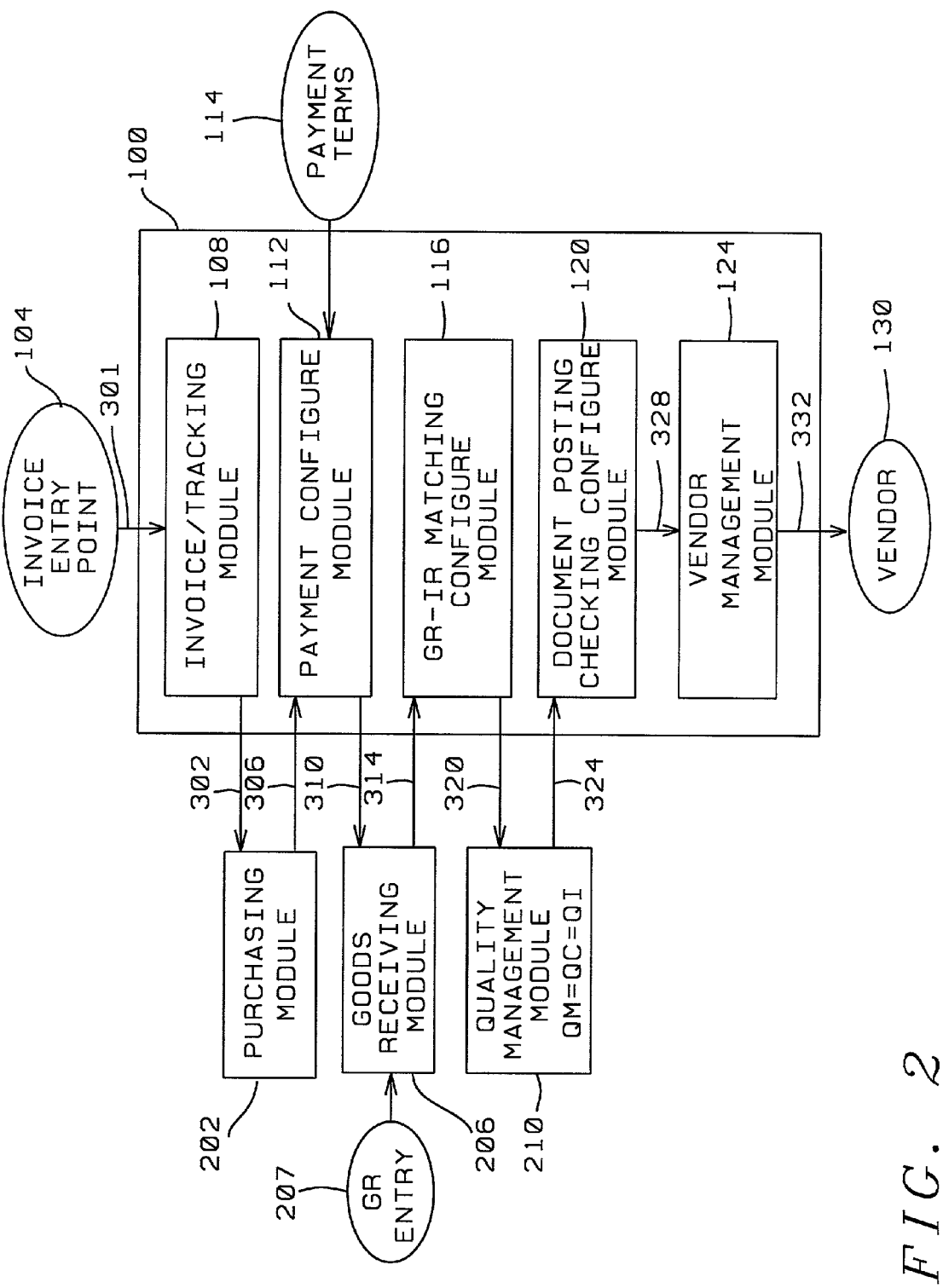
FIG. 2 is a flow chart of an illustration of a preferred embodiment of the payment processing system of the present invention.

E. FIG. 2—Payment System

FIG. 2 includes the following elements:
302—PO number
306—PO attribute, e.g., GR flag
310—Payment control key, PO number
314—GR list of PO numbers
320—GR number
324—QI number, Quality Accept Quantity As shown in FIG. 2, a invoice number 301 and invoice amount are entered from an invoice entry point 104 into a invoice tracking module 108.

The invoice tracking module keeps the invoices processing statuses. The invoice tracking module includes some tables to keep their detail information (e.g., invoice number, PO number, currency amount, vendors code, tax amount, status, GR umber, GR item.

The invoice tracking module 108 transfers a PO 15 number 302 to a purchasing module 202.

The purchasing module 202 transfers a PO attribute 306 to a payment configuration module 112.

Next, when the company buyers have agreed on a new payment terms with the vendors, the payment terms 114 are 20 entered into the payment configuration module 112. An example of payment terms is: (PU05) 90% 1 month after delivery, 10% 1 month after user accept. The payment terms can be entered before the PO is created.

The payment configuration module defines the payment procedure, (when, how many % of total amount and by what payment method (down payment/LC, . . . ) to pay the vendor).

The payment configuration module 112 transfers a payment control key 310 to a goods receiving (GR) module 206.

The goods receiving module 206 transfers a GR list of the PO number 314 to a GR-IR matching configure module 116.

Normally, an ERP system has the PO & GR modules inside. The GR module keeps every good receipt number and their 10 detail information for every PO number. So, GR list is the history information of certain PO number.

The GR-IR matching configure module 116 transfers a GR number 320 to a quality management module 210. The GR-IR matching configure module 116 matches the invoice number against the GR number by some matching rules, e.g., currency, amount tolerance and then transfers the GR number to the quality management module 210.

The quality management module 210 transfers a QI number 324 to a document posting checking configure module 120.

Quality inspection (QI) number 324 is created when a QI staff finishes the inspection of the good in ERP system. It is a serious, unique key number to link to inspection information, e.g., total QC quantity, acceptance quantity, rejection quantity, scrapped quantity etc.

The document posting checking configure module 120 uses the QI number to check the QI status. If the QI status is Ok, Then the document posting checking configure module 120 posts an A/P (accounts payable) document automatically.

The document posting checking configure module 120 transfers payment information 328 to a vendor management module 124.

The vendor-management module 124 sends payment information to a vendor 130 preferably by e-mail or through the company website.

Figure 3:
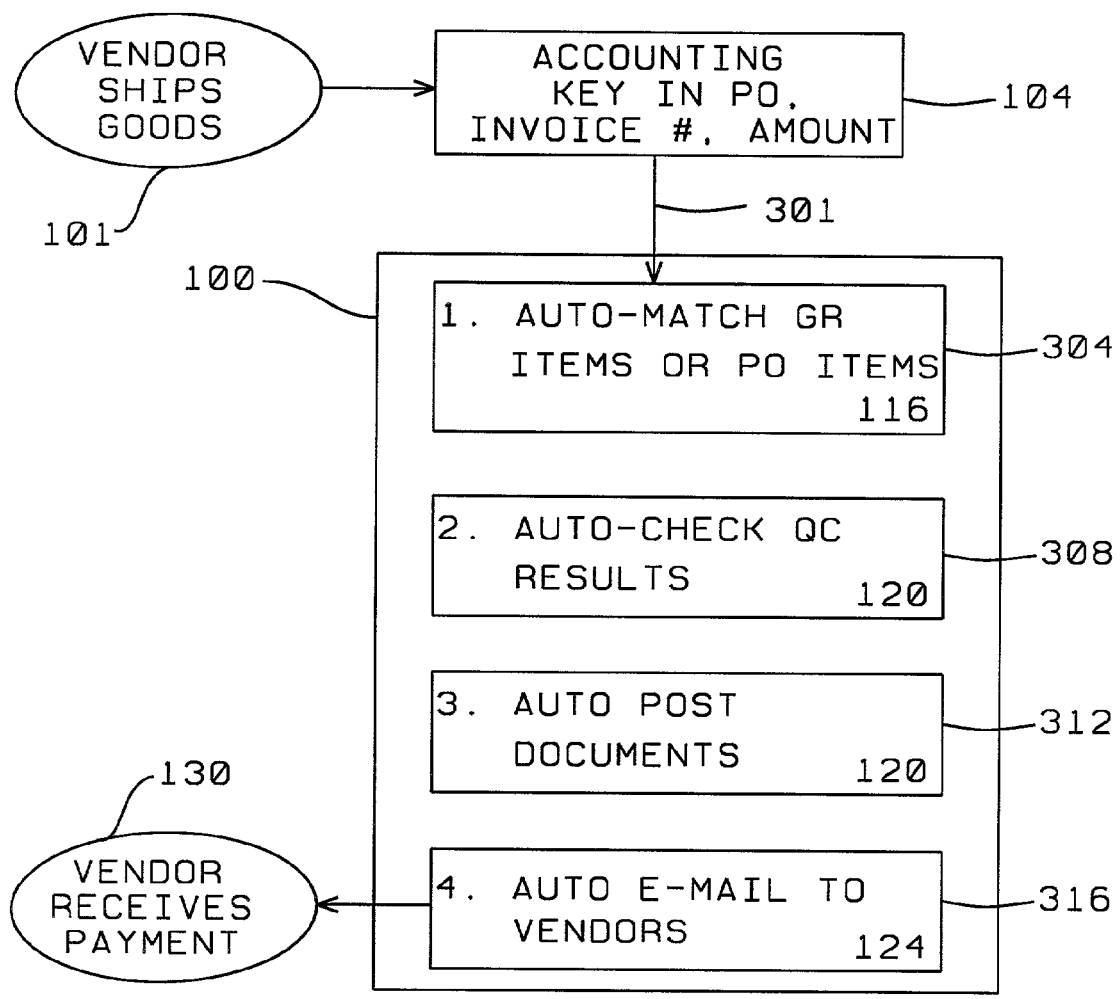
FIG. 3 shows a flow chart of an illustration of a preferred embodiment of the present invention.

F. FIG. 3—Business Flow Using the System of the Invention

FIG. 3 shows an example of the logistical flow from the vendor shipping an order to the vender being paid. The steps shown are performed by the computer program of the invention.

First, the vendor ships the good 101. The accounting personnel keys in the PO, invoice number and the amount (See box 104).

The invention does the processing in box 100.

1) (304) the system/program auto matches the GR item or the PO items 116. Referring to FIG. 3, this is performed in the invention's GR-IR matching configure module 116.

2) (308) auto-checks the Quality control (QC) results 120. Referring to FIG. 3, this is performed in the invention's Document posting checking configuration module 120.

3) auto posts the documents 120—Referring to FIG. 3, this is performed in the invention's Document posting checking configuration module 120.

4) auto transfer payment status information (e.g., email) to vendor 124. Referring to FIG. 3, this is performed in the invention's Vendor management module 124.

The vendor receives the payment status information 130.

G. Front End Graphical User Interface

Figure 4A:
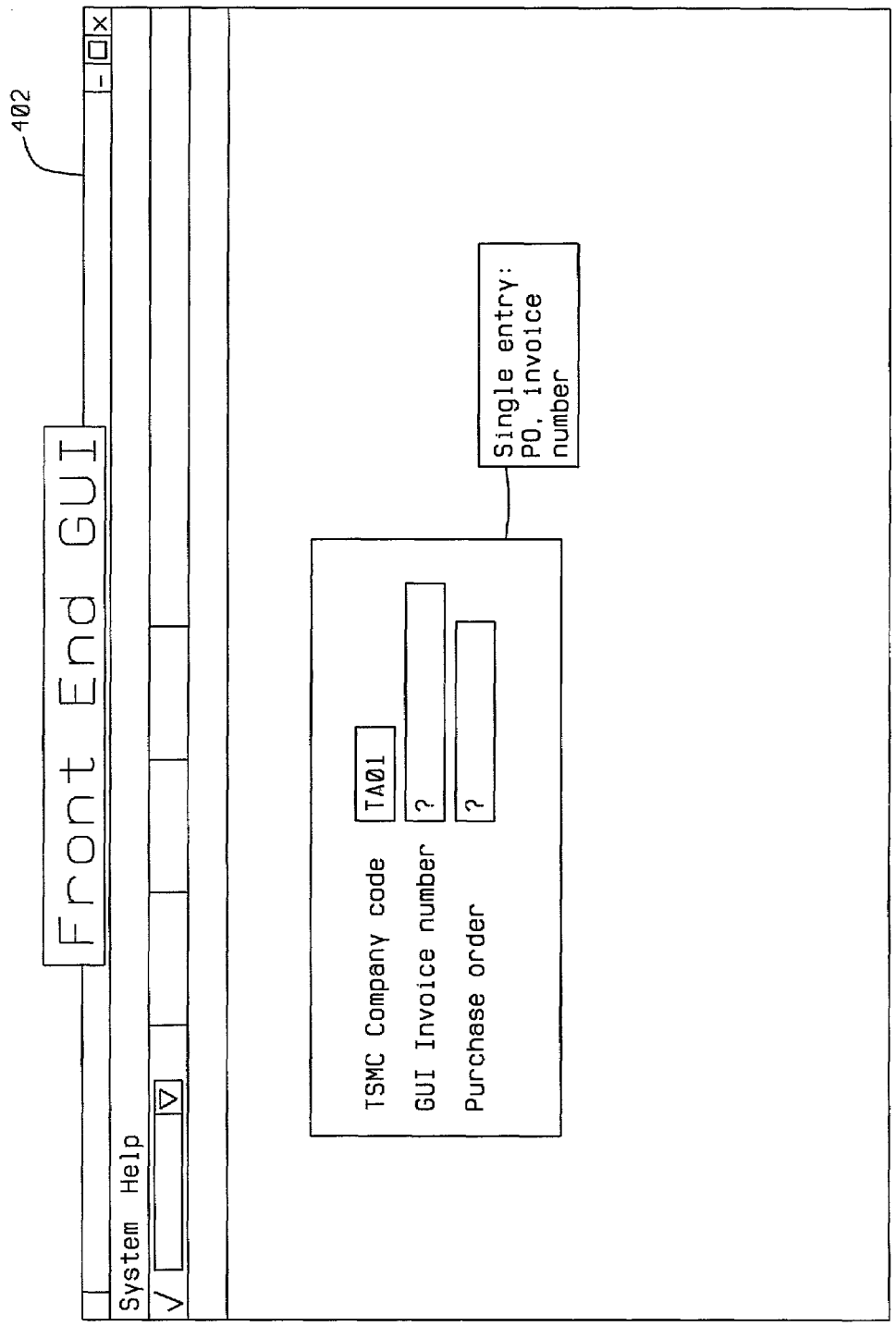

FIGS. 4A, 4B and 4C show examples of the front end GUI (graphical user interface).

Screen 402 (FIG. 4A) is the first front-end screen which allows accountants to enter invoice number, PO number and amount. Behind the screen, the system uses the PO number to link to PO module to get PO attributes.

Screen 404 (FIG. 4B) is second front-end screen that 10 shows the results of the inventions' auto-classification of invoice (e.g, stock on equipment, building, etc.).

Screen 406 (FIG. 4C) is the third front end screen shows one click posting. This is the kernel function of the system. It includes several tasks inside. It retrieves the GR list 15 and then matches the invoice number against a GR number. Also, it retrieves the QI number by the GR number, retrieves QI information by the QI number. End users (accountants) can preview the matching results, then just push the "post all" button to post all A/P documents.

Screen 406 shows the following results 1) Auto search GR: 2) Auto check quality control and 3) Auto post voucher.

II. Benefits of the Invention

The "Payment model of ERP" is a new and very powerful methodology in the ERP system. It leverages several indexes to integrate enterprise process flow chains all the way from purchasing to receiving goods, quality Inspection, payment audits and outgoing payments. ERP systems which apply this model can greatly reduce manpower and cycle time and strengthen relationship with vendors.

By easily entering simple data in the front-end, the system can auto-classify invoices, auto-classify invoices, search GRs, auto-check QC status, auto-post documents, automatically e-mail payment status to vendors etc., All of these are the main inventions of the ERP system.

The invention improves over the existing ERP (e.g., SAP) system by:

1 Auto-classify Invoice types (foreign/local; stock/expense/building/equipment . . .
2. Auto-search appropriate target GR number.
3. Auto-check quality inspection status for GR numbers.
4. Auto-post A/P vouchers.
5. Auto-Email payment status to vendors We have applied this model to the TSMC ERP system since Jul. 1, 1999. It has reduced manpower over 90%, and strengthen the relationship with vendors. It has proved to be a very reliable and valuable model.

While the invention has been particularly shown and described with reference to the preferred embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

The invention claimed is:

1. A computer software implemented method of processing payments; comprising the steps of:
   a) receiving a purchase order (PO) number, an invoice number (IR) and invoice amount from an invoice entry point into a invoice tracking module;
   b) said invoice tracking module transferring a PO number to a purchasing module;
   c) said purchasing module transferring a PO attribute of the PO number to a payment configuration module;
   d) said payment configuration module transferring a payment control key to a goods receiving (GR) module;
   e) said goods receiving module transferring a GR list of the PO number to a GR-IR matching configure module;
   f) said GR-IR matching configure module matching the invoice number against a GR number and then transferring the GR number to a quality management module;
   g) said quality management module transferring a quality inspection (QI) number of the GR number to a document posting checking configure module;
   h) said document posting checking configure module using said QI number to check QI information;
   i) said document posting checking configure module posting an accounts payable document and then transferring payment information to a vendor management module;
   j) said vendor management module sending the payment information to a vendor.

2. The method of claim 1 which further includes a database of PO numbers, Payment terms, Good received and the invoice amount and searching said database to determine an open GR number based on the PO number and the invoice amount.

3. The method of claim 1 wherein said purchasing module, said goods receiving module and said Quality management module are modules in an Enterprise Resource Planning (ERP) software program.

4. The method of claim 1 wherein the purchase order number (PO), the invoice number, and the invoice amount is entered by a person at the invoice entry point.

5. The method of claim 1 wherein said payment terms are entered into said payment configuration module before a purchase order is created.

6. A processing system for processing payments; comprising:
- a) a means for receiving a purchase order (PO) number, an invoice number (IR), and an invoice amount from an invoice entry point into a invoice tracking module;
- b) a means for said invoice tracking module transferring a PO number to a purchasing module;
- c) a means for said purchasing module transferring a PO attribute of the PO number to a payment configuration module;
- d) a means for said payment configuration module transferring a payment control key to a goods receiving (GR) module;
- e) a means for said goods receiving module transferring a GR list of the PO number to a GR-IR matching configure module;
- f) a means for said GR-IR matching configure module matching the invoice number against a GR number and then transferring the GR number to a quality management module;
- g) a means for said quality management module transferring a quality inspection (QI) number of the GR number to a document posting checking configure module;
- h) a means for said document posting checking configure module using said QI number to check QI information;
- i) a means for said document posting checking configure module posting an accounts payable document and then transferring payment information to a vendor management module; and
- j) a means for said vendor management module sending payment information to a vendor.

7. The processing system of claim 6 which further includes
- a database of PO numbers, Payment terms, Good received and the invoice amount; and
- a means for searching said database to determine an open GR number based on the PO number and the invoice amount.

8. The processing system of claim 6 wherein said purchasing module, said goods receiving module and said quality management module are modules in an Enterprise Resource Planning (ERP) software program.

9. The processing system of claim 6 wherein the purchase order (PO) number, the invoice number (IR), and the invoice amount are entered by a person at the invoice entry point.

10. The processing system of claim 6 wherein said payment terms are entered into said payment configuration module before a purchase order (PO) is created.

11. A computer readable medium having encoded thereon a process comprising:
- receiving, at an invoice tracking module, a purchase order (PO) number, an invoice number (IR) and invoice amount from an invoice entry point;
- transferring a PO number from the invoice tracking module to a purchasing module;
- transferring a PO attribute of the PO number from the purchasing module to a payment configuration module;
- transferring a payment control key from the payment configuration module to a goods receiving (GR) module;
- transferring a GR list of the PO number from the goods receiving module to a GR-IR matching configure module;
- matching the invoice number against a GR number and transferring the GR number from the GR-IR matching configure module to a quality management module;
- transferring a quality inspection (QI) number of the GR number from the quality management module to a document posting checking configure module;
- checking, at the document posting checking configure module, QI information using said QI number;
- posting an accounts payable document and transferring payment information from the document posting checking configure module to a vendor management module; and
- sending the payment information from the vendor management module to a vendor.

12. The method of claim 1, wherein said document posting checking configure module using said QI number to check QI information by checking quality inspection status of a good received based on the QI number.

13. The method of claim 1, wherein said GR-IR matching configure module matches the invoice number against a GR number by using at least one matching rule.

14. The method of claim 1, wherein the QI number is a unique key number linking a good identified by the GR number to quality inspection information of the good.

15. The processing system of claim 6, wherein a means for said document posting checking configure module using said QI number to check QI information comprises means for checking quality inspection status of a good received based on the QI number.

16. The processing system of claim 6, wherein a means for said GR-IR matching configure module matching the invoice number against a GR number by using at least one matching rule.

17. The processing system of claim 6, wherein the QI number is a unique key number linking a good identified by the GR number to quality inspection information of the good.

* * * * *